(12) United States Patent
Koppineedi et al.

(10) Patent No.: US 10,457,112 B2
(45) Date of Patent: Oct. 29, 2019

(54) CONFIGURABLE EVAPORATOR UNIT AIR OUTLETS FOR A SECONDARY HVAC SYSTEM

(71) Applicant: THERMO KING CORPORATION, Minneapolis, MN (US)

(72) Inventors: Srinivasa Rao Koppineedi, Minneapolis, MN (US); Michael R. Weiss, Minneapolis, MN (US); Peter J. Loomis, Minneapolis, MN (US); Terrence Bray, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 130 days.

(21) Appl. No.: 15/626,822

(22) Filed: Jun. 19, 2017

(65) Prior Publication Data
US 2018/0361821 A1 Dec. 20, 2018

(51) Int. Cl.
*B60H 1/00* (2006.01)
*B60H 1/32* (2006.01)

(52) U.S. Cl.
CPC ..... *B60H 1/00542* (2013.01); *B60H 1/00592* (2013.01); *B60H 1/3229* (2013.01)

(58) Field of Classification Search
CPC ............ B60H 1/00542; B60H 1/00592; B60H 1/3229; B60H 1/00514; B60H 2001/00621; F25D 23/02; F25D 23/023; F25D 23/025; F24F 13/20; F24F 1/0011; F24F 1/0014; F24F 2013/205
USPC .................................. 62/326, 409, 411, 517
See application file for complete search history.

(56) References Cited

U.S. PATENT DOCUMENTS

| | | | |
|---|---|---|---|
| 4,549,405 A * | 10/1985 | Anderson | B60H 1/00014 62/239 |
| 5,154,223 A | 10/1992 | Ishimaru et al. | |
| 5,162,020 A | 11/1992 | Asano et al. | |
| 5,444,990 A * | 8/1995 | McGill, III | F24F 1/022 417/223 |
| 6,101,829 A * | 8/2000 | Robinson | F24F 1/0014 62/259.1 |
| 6,644,559 B2 | 11/2003 | Kondo et al. | |

(Continued)

FOREIGN PATENT DOCUMENTS

| | | |
|---|---|---|
| GB | 2340597 | 2/2000 |
| JP | H08318726 | 12/1996 |

OTHER PUBLICATIONS

U.S. Appl. No. 15/411,114, filed Jan. 20, 2017 (42 pages).

*Primary Examiner* — Joseph F Trpisovsky
(74) *Attorney, Agent, or Firm* — Hamre, Schumann, Mueller & Larson, P.C.

(57) ABSTRACT

A configurable evaporator unit for a secondary heating, ventilation and air conditioning (HVAC) system that provides conditioned air within a cabin portion of a vehicle is provided. The configurable evaporator unit includes an evaporator unit and a blower assembly disposed within a housing. The blower assembly houses an evaporator blower for directing conditioned air out of the configurable evaporator unit. The blower assembly includes a plurality of blower openings for directing conditioned air out of the blower assembly. The housing includes a plurality of housing openings. One or more of the plurality of housing openings is prevented from directing conditioned air out of the configurable evaporator unit.

18 Claims, 10 Drawing Sheets

(56) References Cited

U.S. PATENT DOCUMENTS

| | | | | |
|---|---|---|---|---|
| 8,056,352 B2* | 11/2011 | Kang | ............... | F24F 1/0014 312/236 |
| 2001/0016472 A1 | 8/2001 | Herta | | |
| 2002/0102935 A1 | 8/2002 | Auquier | | |
| 2004/0194947 A1 | 10/2004 | Ito et al. | | |
| 2009/0229281 A1* | 9/2009 | Harris | ............... | B60H 1/00535 62/115 |
| 2011/0308266 A1* | 12/2011 | Lafleur | ............... | F24F 1/0014 62/186 |

\* cited by examiner

CONFIGURABLE EVAPORATOR UNIT AIR OUTLETS FOR A SECONDARY HVAC SYSTEM

FIELD

This disclosure relates to a secondary heating, ventilation and air conditioning (HVAC) system of a vehicle. More particularly, this disclosure is directed to a configurable evaporator unit of the secondary HVAC system.

BACKGROUND

Large tractors or trucks (e.g., semi-tractors, day cabs, etc.) are commonly used to transport cargo within a trailer or container. Existing tractors in a tractor-trailer combination typically include a sleeper cabin for the occupant (e.g., driver or passenger) to rest during a journey. Auxiliary power units (APUs) are used with semi-tractors to provide power to the sleeper cabin when the primary power source (e.g., tractor engine, high voltage battery source, etc.) is turned off (i.e., deactivated). The APU can provide power to one or more of cabin accessories and a secondary HVAC system. This can reduce fuel consumption, maintenance costs, emissions, and noise generated by not requiring the tractor main power source to operate (e.g., idle when the main power source is a tractor engine) during occupant rest periods or other periods of vehicle non-movement.

SUMMARY

This disclosure relates generally to a secondary HVAC system of a vehicle. More particularly, this disclosure is directed to a configurable evaporator unit of the secondary HVAC system.

In particular, the embodiments described herein provide configurable evaporator unit for a secondary HVAC system of a vehicle in which the location of one or more air outlets can be modified by the end user.

The embodiments described herein can be used, for example, in large tractors and trucks (e.g., semi-tractors, day cabs, etc.).

The embodiments described herein can provide improved flexibility in installing the configurable evaporator unit within the vehicle. That is, the embodiments described herein can allow an end user to selectively position one or more air outlets of the configurable evaporator unit. By selectively configuring the location of one or more air outlets of the configurable evaporator unit, the embodiments described herein can: increase useable space within the vehicle (e.g., reduce routing of air duct(s)); improve airflow distribution (e.g., reduce a pressure drop through the air duct(s)); and provide flexibility in positioning the configurable evaporator unit within the vehicle.

The embodiments described herein can provide a configurable evaporator unit that can be modified, for example, to include: two air outlet openings on a front side of the configurable evaporator unit; two air outlet openings on a back side of the configurable evaporator unit; an air outlet opening on a front side, a back side, a top side, a bottom side and an exterior side of the configurable evaporator unit; one or two air outlet openings on a top side of the configurable evaporator unit; an air outlet opening on a front side of the configurable evaporator unit and an air outlet opening on a top side of the configurable evaporator unit; etc.

In one embodiment, a configurable evaporator unit for a secondary HVAC system that provides conditioned air within a cabin portion of a vehicle is provided. The configurable evaporator unit includes an evaporator unit and a blower assembly both provided in a housing. The blower assembly houses an evaporator blower for directing conditioned air out of the configurable evaporator unit. The blower assembly includes a plurality of blower openings for directing conditioned air out of the blower assembly with each of the plurality of blower openings provided on one of a front side surface, a back side surface, a top side surface, a bottom side surface, and an exterior side surface. The housing includes a plurality of housing openings with each of the plurality of housing openings disposed on one of a front side, a back side, a top side, a bottom side, and an exterior side of the housing. One or more of the plurality of housing openings is prevented from directing conditioned air out of the configurable evaporator unit.

In another embodiment, a HVAC system for a cabin portion of a vehicle that provides conditioned air within the cabin portion is provided. The secondary HVAC system includes a controller, an auxiliary power unit, a refrigerant compressor, a condenser unit and a configurable evaporator unit. The controller is configured to control operation of the secondary HVAC system. The auxiliary power unit is configured to provide power to the secondary HVAC system. The refrigerant compressor is configured to compress refrigerant and is powered by the auxiliary power unit. The condenser unit is configured to condense refrigerant received from the refrigerant compressor. The configurable evaporator unit includes an evaporator unit and a blower assembly both provided in a housing. The blower assembly houses an evaporator blower for directing conditioned air out of the configurable evaporator unit. The blower assembly includes a plurality of blower openings for directing conditioned air out of the blower assembly with each of the plurality of blower openings provided on one of a front side surface, a back side surface, a top side surface, a bottom side surface, and an exterior side surface. The housing includes a plurality of housing openings with each of the plurality of housing openings disposed on one of a front side, a back side, a top side, a bottom side, and an exterior side of the housing. One or more of the plurality of housing openings is prevented from directing conditioned air out of the configurable evaporator unit.

BRIEF DESCRIPTION OF THE DRAWINGS

References are made to the accompanying drawings that form a part of this disclosure, and which illustrate the embodiments in which the systems and methods described in the Specification can be practiced. Like references numbers represent like parts throughout.

FIGS. 2A-C illustrate a front perspective view of the configurable evaporator unit under three different configurations. FIGS. 2D-F illustrate a back perspective view of the configurable evaporator unit under three different configurations.

FIG. 3A illustrates a front perspective view of the configurable evaporator unit. FIG. 3B illustrates a back perspective view of the configurable evaporator unit. FIG. 3C illustrates a blown up portion of a front side and top side of the configurable evaporator unit with air ducts attached thereto.

DETAILED DESCRIPTION

This disclosure relates generally to a secondary HVAC system of a vehicle. More particularly, this disclosure is directed to a configurable evaporator unit of the secondary HVAC system.

In particular, the embodiments described herein provide a configurable evaporator unit for a secondary HVAC system of a vehicle in which the location of one or more air outlets can be selected by the end user.

The embodiments described herein can provide improved flexibility in installing the configurable evaporator unit within the vehicle. That is, the embodiments described herein can allow an end user to selectively position one or more air outlets of the configurable evaporator unit. By selectively configuring the location of one or more air outlets of the configurable evaporator unit, the embodiments described herein can: increase useable space (e.g., reduce routing of air duct(s)) within the vehicle (e.g., for storage); improve airflow distribution (e.g., reduce a pressure drop through the air duct(s)); and provide flexibility in positioning the configurable evaporator unit within the vehicle.

The terms "above," "top," "bottom," "front," "back," "left," "right" and the like used herein are in reference to the relative positions of the a configurable evaporator unit, as oriented in the specific figures being described. These terms are not meant to be limiting in any way.

Figure 1:
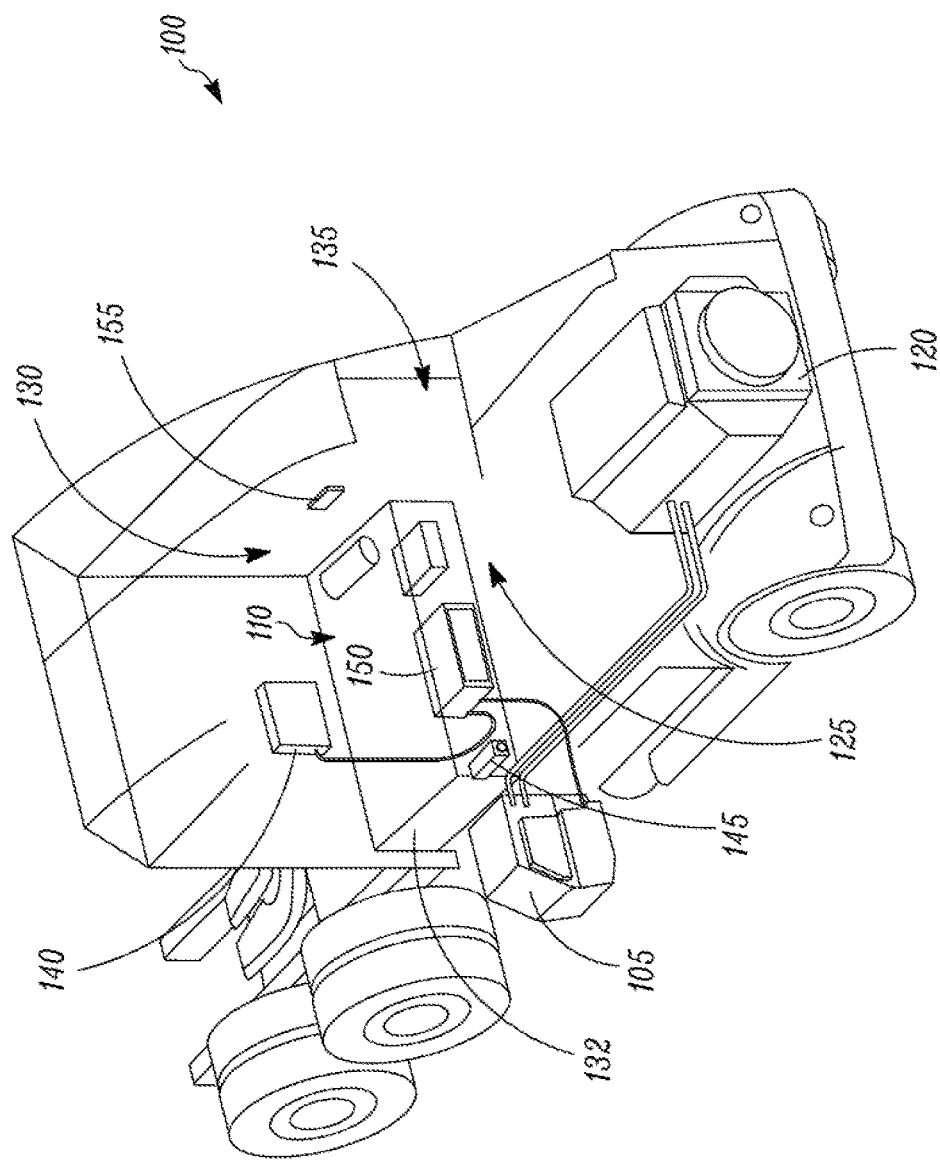
FIG. 1 illustrates a schematic view of a vehicle with an APU and a secondary HVAC system, according to one embodiment.

FIG. 1 illustrates a schematic view of a vehicle 100 with an APU 105 and a secondary HVAC system 110, according to one embodiment. The vehicle 100 is a semi-tractor (e.g., a class 8 tractor) that can be used, for example, to transport cargo stored in a cargo compartment (e.g., a container, a trailer, etc.) to one or more destinations. It will be appreciated that in other embodiments, the vehicle 100 can be, for example, a straight truck, a van, etc. Hereinafter, the term "vehicle" shall be used to represent all such tractors and trucks, and shall not be construed to limit the invention's application solely to a tractor in a tractor-trailer combination.

The vehicle 100 includes a primary power source 120, a cabin 125 defining a sleeping portion 130 and a driving portion 135, and a plurality of vehicle accessories (not shown). The cabin 125 can be accessible via a driver side door (not shown) and a passenger side door (not shown). The cabin 125 can include a primary HVAC system (not shown) as a vehicle accessory that can be configured to provide conditioned air within driving portion 135 and potentially the entire cabin 125, and the secondary HVAC system 110 for providing conditioned air within the sleeping portion 130. The cabin 125 can also include a plurality of cabin accessories (not shown). Examples of cabin accessories can include, for example, sunshade(s) for a window/windshield of the vehicle 100, a refrigerator, a television, a video game console, a microwave, one or more device charging station(s), a continuous positive airway pressure (CPAP) machine, and a coffee maker. The secondary HVAC system 110 can also be considered as a cabin accessory.

The primary power source 120 can provide sufficient power to operate (e.g., drive) the vehicle 100 and any of a plurality of vehicle accessories (e.g., the primary HVAC system) and cabin accessories. In some embodiments, the primary power source 120 is the only power source that provides power to the primary HVAC system. The primary power source 120 can also provide power to charge, for example, batteries of the APU 105. In some embodiments, the primary power source 120 can be a prime mover such as, for example, a diesel engine.

The APU 105 is a secondary power unit for the vehicle 100 when the primary power source 120 is unavailable. When, for example, the primary power source 120 is unavailable, the APU 105 can be configured to provide power to one or more of the vehicle accessories and the cabin accessories. In particular, the APU 105 can provide power to the secondary HVAC system 110 when the primary power source 120 (and accordingly the primary HVAC system) is unavailable. In some embodiments, the APU 105 can be an electric powered APU. In other embodiments, the APU 105 can be a prime mover powered APU. The APU 105 can be attached to the vehicle 100 using any attachment method. In some embodiments, the APU 105 can be turned on (i.e., activated) or off (i.e., deactivated) by an occupant (e.g., driver or passenger) of the vehicle 100. The APU 105 generally does not provide sufficient power for operating (e.g., driving) the vehicle 100.

In some embodiments, the APU 105 can include a power source (e.g., a prime mover, a battery, a fuel cell, etc.) for powering the APU 105, a refrigerant compressor (not shown) for the secondary HVAC system 110, an alternator (not shown), a maintenance switch (not shown), etc.

The secondary HVAC system 110 includes a refrigerant compressor (not shown), a condenser unit 140, a heater unit 145, a configurable evaporator unit 150 and a controller 155. In some embodiments, the refrigerant compressor can be provided in the APU 105. In some embodiments, the refrigerant compressor can be provided in the configurable evaporator unit 150. In the embodiment shown in FIG. 1, the condenser unit 140 is mounted at the back of the cabin 125 for condensing refrigerant received from the refrigerant compressor. The heater unit 145 is configured to provide heated air to the sleeping portion 130 and potentially the driving portion 135. In the embodiment shown in FIG. 1, the heater unit 145 is positioned under a sleeping bunk 132 in the sleeping portion 130. The controller 155 can be a human machine interface (HMI) controller that controls operation of the secondary HVAC system 110 (including, for example, a power and operation mode of the secondary HVAC system 110, a temperature of conditioned air in the cabin 125, a fan speed of an evaporator blower of the configurable evaporator unit 150, etc.) and provides operation status information of the secondary HVAC system 110. In the embodiment shown in FIG. 1, the HMI controller is positioned onto a wall of the vehicle 100 in the sleeping portion 130. The configurable evaporator unit 150 is configured to provide conditioned air within the sleeping portion 130 and potentially the driving portion 135. In the embodiment shown in FIG. 1, the configurable evaporator unit 150 is positioned under the sleeping bunk 132 in the sleeping portion 130. It will be appreciated that in other embodiments, the configurable evaporator unit 150 can be positioned in any other location within the vehicle 100 including, for example, on any side of the sleeping portion 130, within a cabinet (not shown) of the sleeping portion 130, within a closet (not shown) of the sleeping portion 130, etc. The configurable evaporator unit 150 can include one or more air outlet(s) from which one or more air duct(s) (not shown) can be connected to provide airflow to different locations within the vehicle 100. Details of a configurable evaporator unit such as the configurable evaporator unit 150 are discussed below with respect to FIGS. 2A-F.

FIGS. 2A-F illustrate different configurations of a configurable evaporator unit 200, according to one embodiment.

The configurable evaporator unit 200 can be used in a vehicle (e.g., the vehicle 100 shown in FIG. 1) as part of for example, a secondary HVAC system. The configurable evaporator unit 200 has a front side 201, a back side 202, a top side 203, a bottom side 204, a right side 206, and a left side 207. The configurable evaporator unit 200 includes a housing 205 for housing a blower assembly 215 and an evaporator compartment 220.

The housing 205 includes a base 208 and a cover 210. The base 208 defines the front side 201, the bottom side 204 and a portion of the right side 206. The cover 210 defines the back side 202 and the top side 203. A surface of the blower assembly 215 defines the right side 206 and an air filter 209 of the evaporator compartment 220 defines the left side 207. It will be appreciated that in other embodiments, the base 208 or the cover 210 can include a side surface (not shown) that can be configured to define the right side 206 rather than a surface of the blower assembly 215. As described herein, a side surface of the configurable evaporator unit 200 where the blower assembly 215 is provided and that is opposite a side of the configurable evaporator unit 200 where the evaporator compartment 220 is disposed can be referred to as a blower side. In this embodiment, the right side 206 is the blower side.

The evaporator compartment 220 includes a portion of a refrigeration circuit (not shown), an evaporator coil (not shown) and an air filter 209. The air filter 209 is configured to filter and direct air into the evaporator compartment 220. The evaporator coil using refrigerant provided by the refrigeration circuit is configured to condition (e.g., cool) air entering the evaporator compartment 220. The conditioned air is then directed to the blower assembly 215.

The blower assembly 215 includes an evaporator blower (not shown) that is configured to direct the conditioned air out of the configurable evaporator unit 200.

A front side surface, back side surface, a top side surface, a bottom side surface, and an exterior side surface (e.g., a right side surface) of the blower assembly 215 and/or the front side 201, the back side 202, the top side, 203, the bottom side 204, and the right side 206 (e.g., exterior side) of the housing 205 can include one or more openings (not shown) for directing conditioned air out of the blower assembly 215. In some embodiments, a front side and/or a bottom side of the base 208 can include one or more openings (not shown) for directing conditioned air out of the blower assembly 215.

Figure 2A:
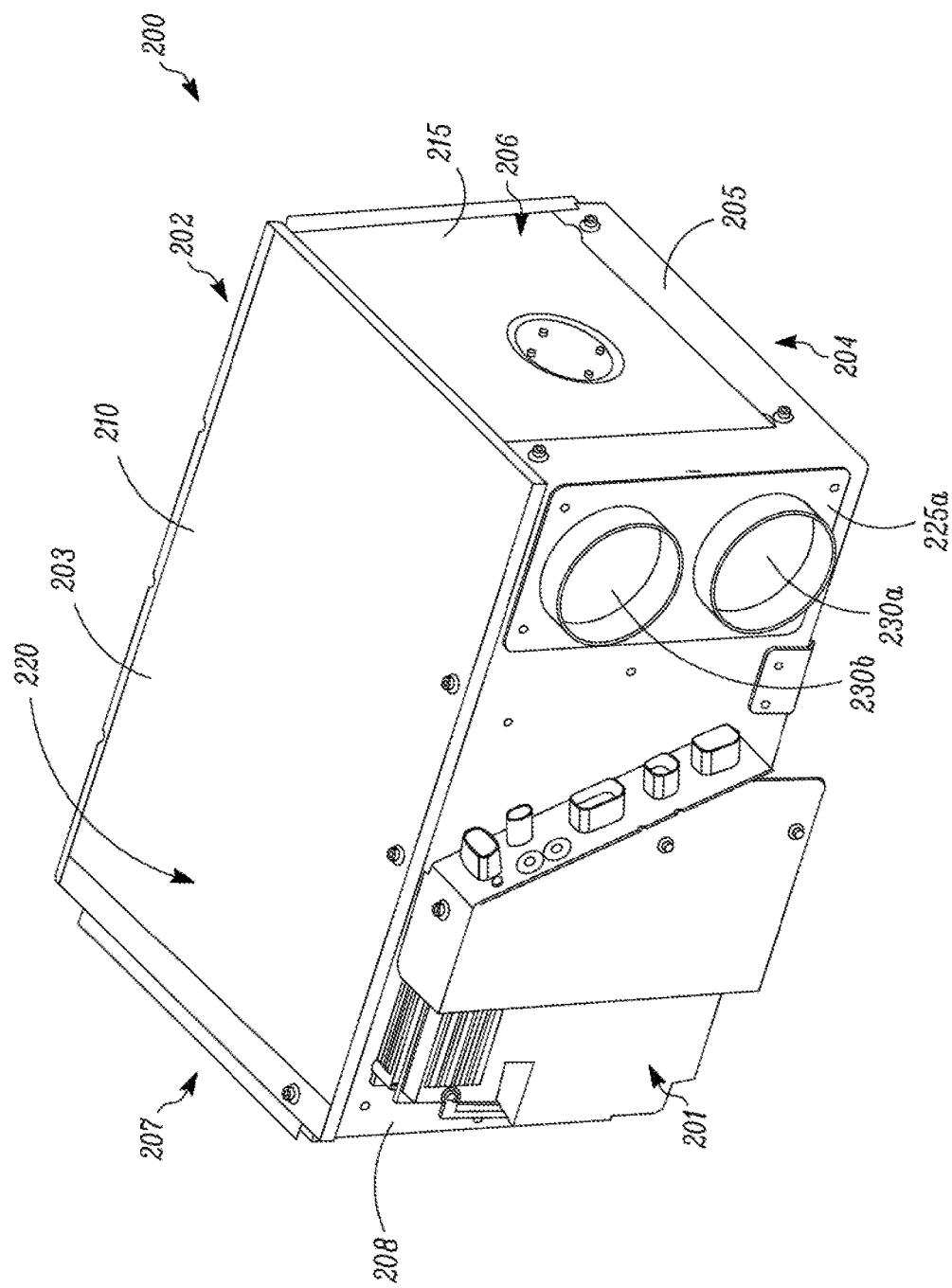
FIGS. 2A-F illustrates different configurations of a configurable evaporator unit, according to one embodiment.
Figure 2B:
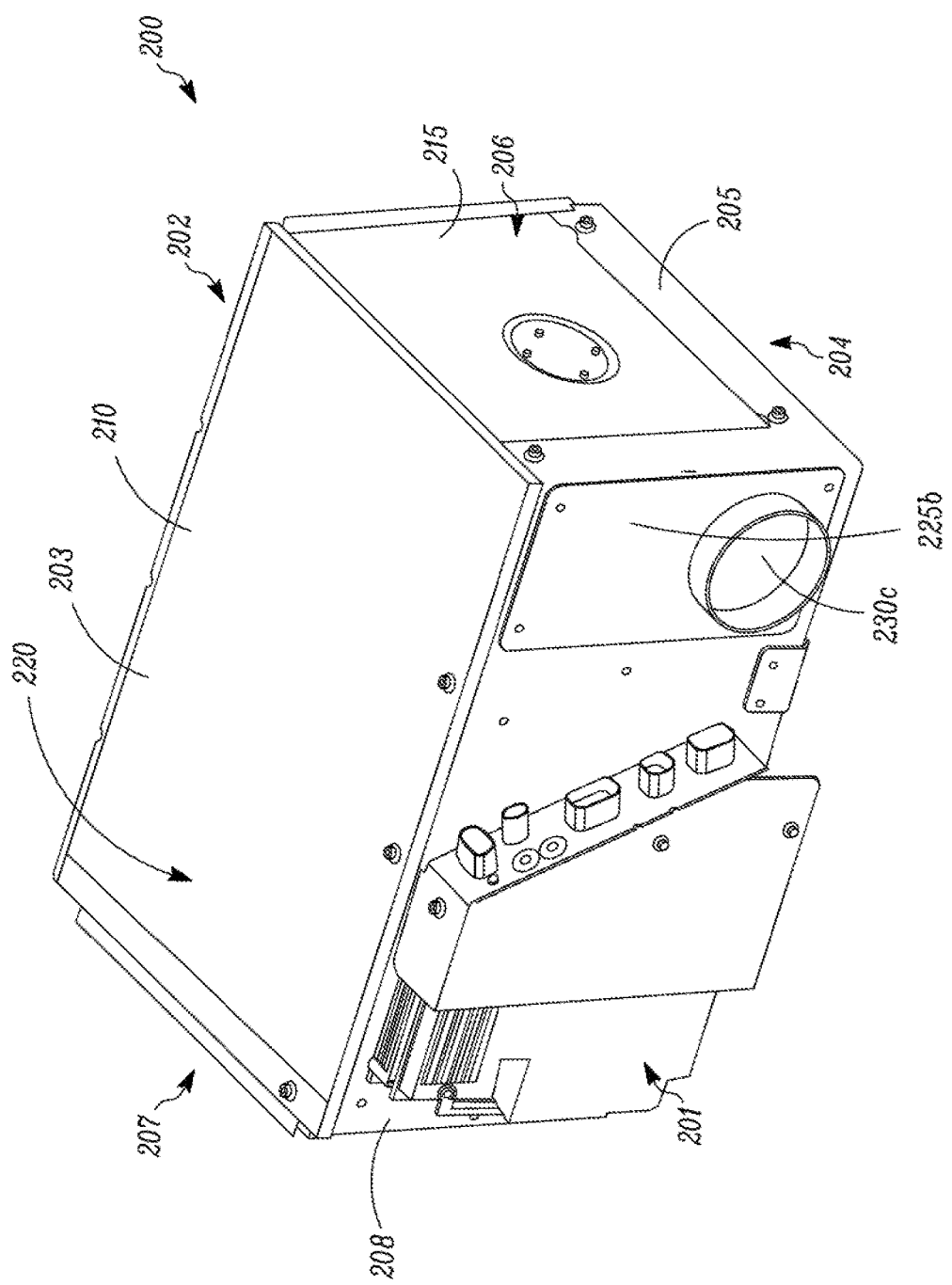
Figure 2C:
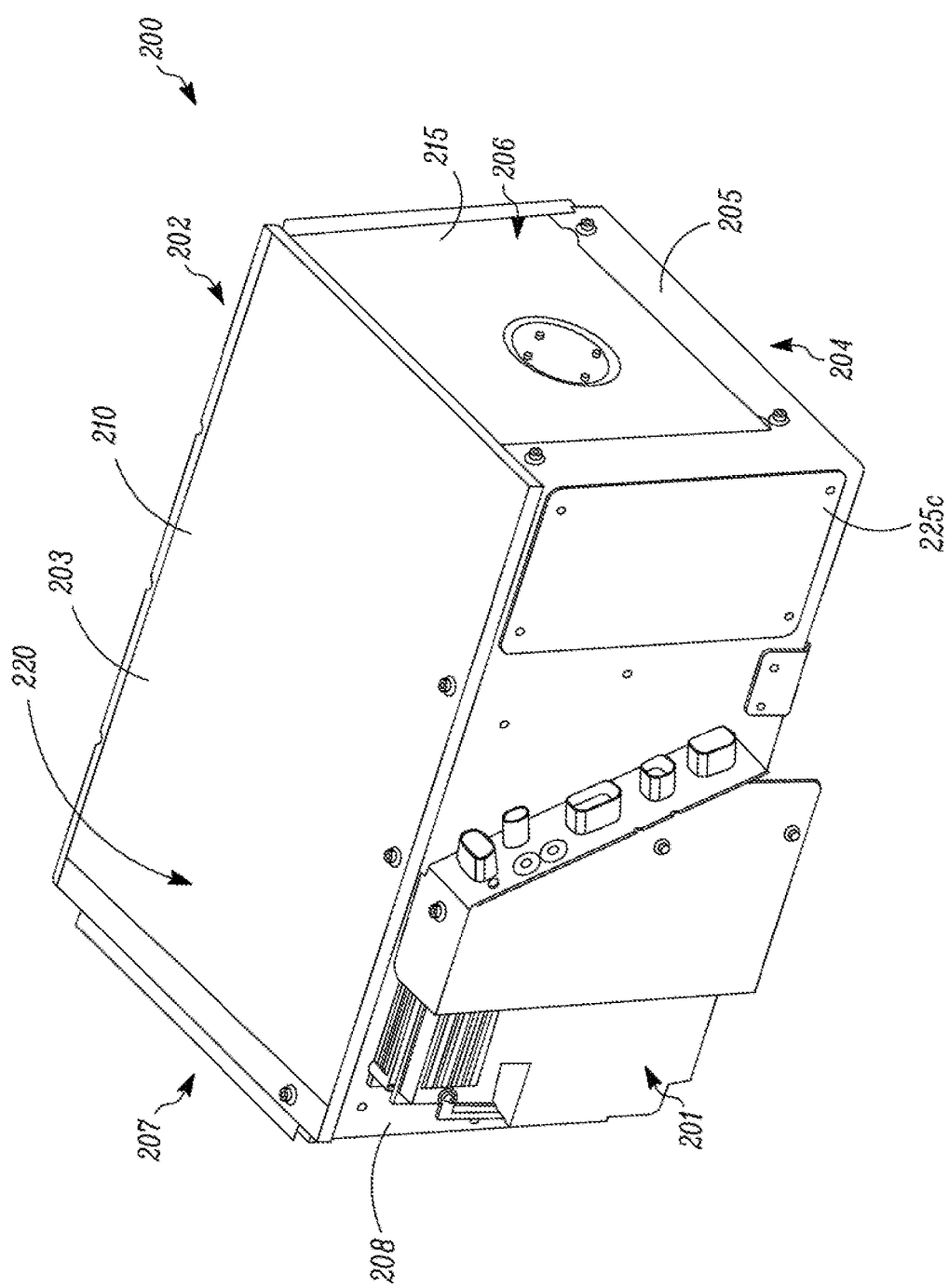

FIGS. 2A-C illustrate different configurations of the front side 201 of the configurable evaporator unit 200. In the configuration shown in FIG. 2A, the base 208 includes an adapter plate 225a attached on the front side 201 near the right side 206 where the blower assembly 215 is disposed. The adapter plate 225a includes two air outlet openings 230a,b that are positioned over the openings of the blower assembly 215. Accordingly, conditioned air can be directed out of the configurable evaporator unit 200 via each of the air outlet openings 230a,b. In some embodiments, the air outlet openings 230a,b can be sized to allow an air duct (also referred to as an "air hose") to be attached thereto. The air duct(s) can then route the conditioned air to other locations within, for example, a vehicle. In some embodiments, the air outlet openings 230a,b can be sized to accommodate standard sized air duct(s) (e.g., that are four inches in diameter).

In another configuration, as shown in FIG. 2B, the base 208 includes an adapter plate 225b attached on the front side 201 near the right side 206 where the blower assembly 215 is disposed. The adapter plate 225b includes a single air outlet opening 230c that is positioned over one of the openings of the blower assembly 215. Accordingly, conditioned air can be directed out of the configurable evaporator unit 200 via the air outlet opening 230c. In this configuration, the adapter plate 225b is attached such that the air outlet opening 230c is positioned over the opening of the blower assembly 215 that is closer to the bottom side 204 of the configurable evaporator unit 200. It will be appreciated that in other embodiments, the adapter plate 225b can be attached such that the air outlet opening 230c is positioned over the opening of the blower assembly 215 that is closer to the top side 203 of the configurable evaporator unit 200. In some embodiments, the air outlet opening 230c can be sized to allow an air duct (also referred to as an "air hose") to be attached thereto.

In yet another configuration, as shown in FIG. 2C, the base 208 includes an adapter plate 225c attached on the front side 201 near the right side 206 where the blower assembly 215 is disposed. The adapter plate 225c does not include an air outlet opening that could be positioned over one of the openings of the blower assembly 215. Accordingly, the configurable evaporator unit 200 is configured such that conditioned air is not directed out of the front side 201 of the configurable evaporator unit 200.

Figure 2D:
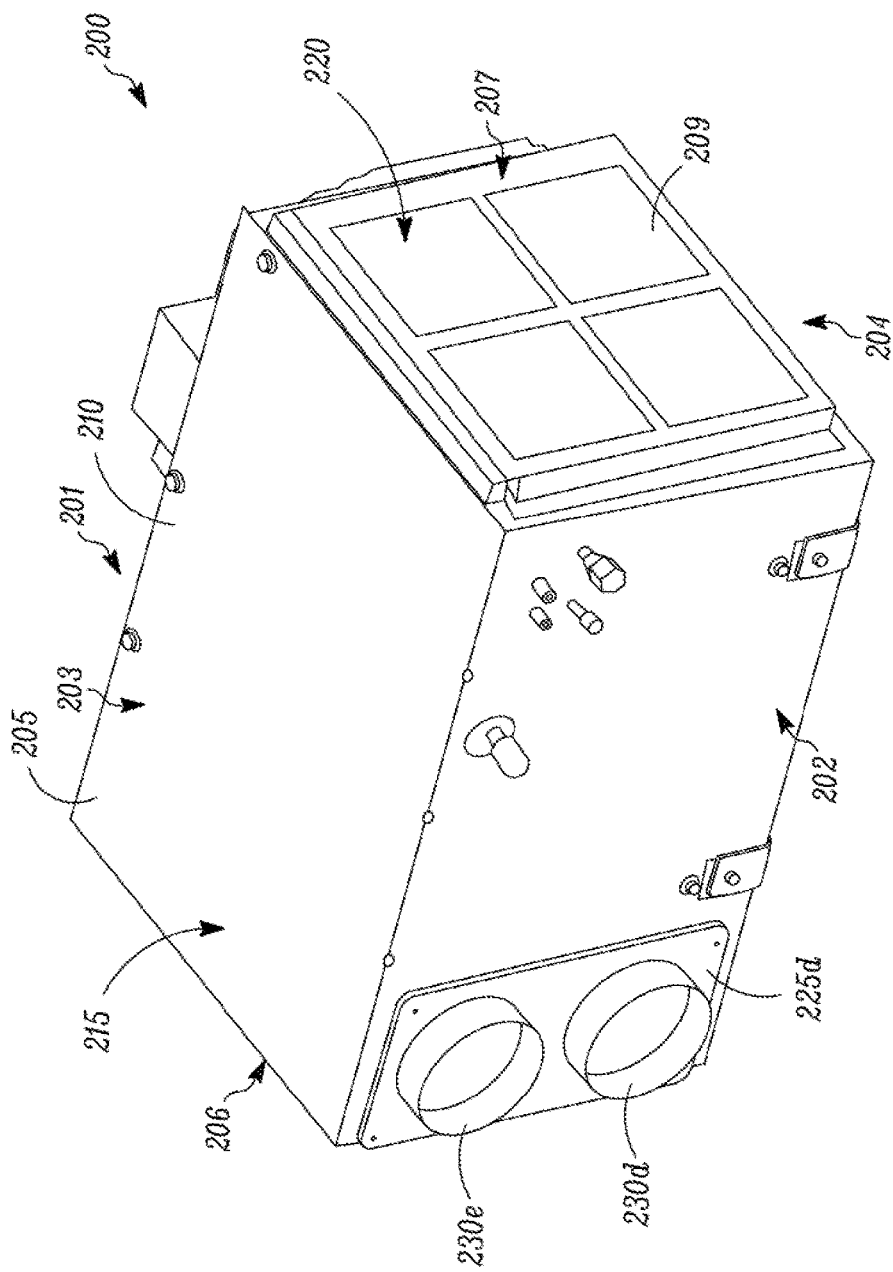
Figure 2E:
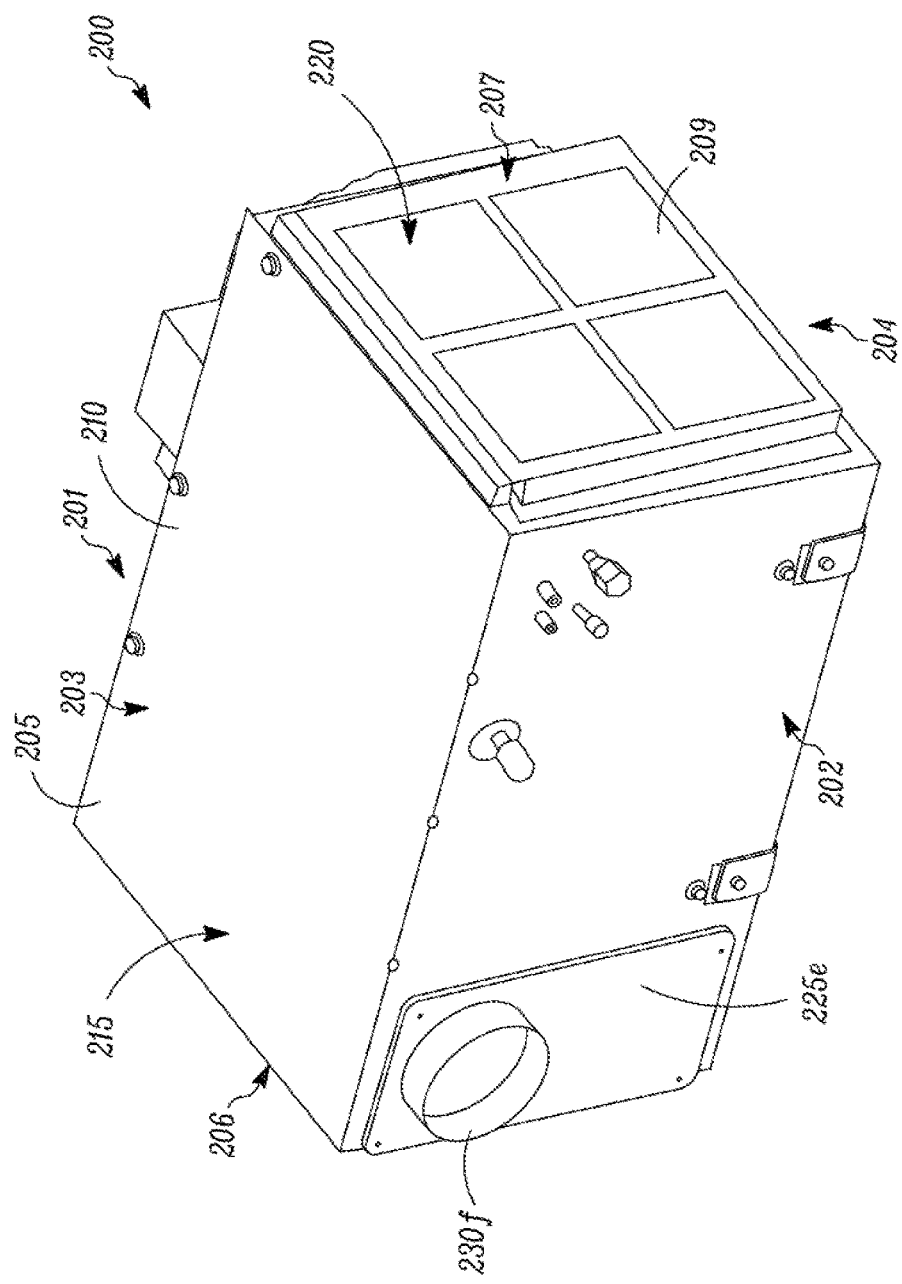
Figure 2F:
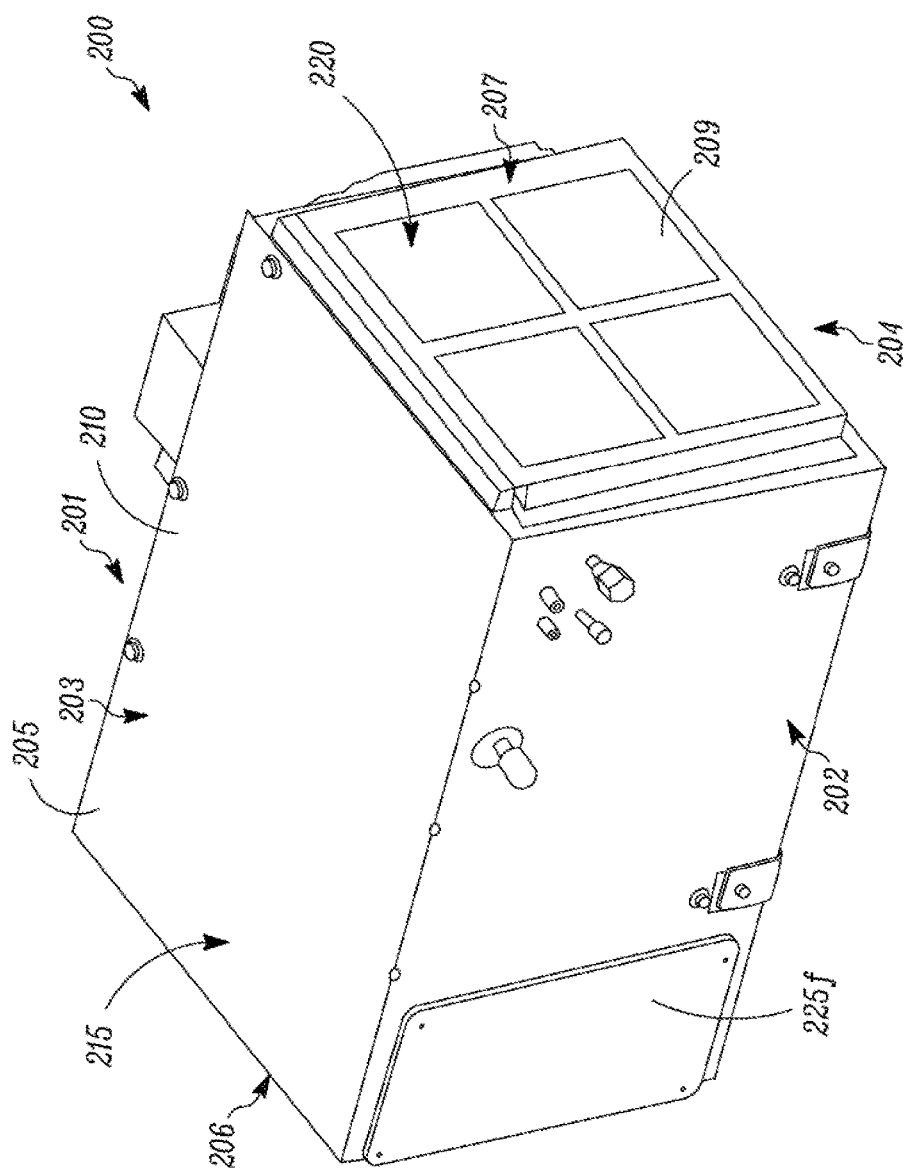

FIGS. 2D-F illustrate different configurations of the back side 202 of the configurable evaporator unit 200. It will be appreciated that any of the configurations of the front side 201 of the configurable evaporator unit 200 shown in FIGS. 2A-C can be combined with any of the configurations of the back side 202 shown in FIGS. 2D-F In the configuration shown in FIG. 2D, the cover 210 includes an adapter plate 225d attached on the back side 202 near the right side 206 where the blower assembly 215 is disposed. The adapter plate 225d includes two air outlet openings 230d,e that are positioned over the openings of the blower assembly 215. Accordingly, conditioned air can be directed out of the configurable evaporator unit 200 via each of the air outlet openings 230d,e. In some embodiments, the air outlet openings 230d,e can be sized to allow an air duct (also referred to as an "air hose") to be attached thereto. The air duct(s) can then route the conditioned air to other locations within, for example, a vehicle.

In another configuration, as shown in FIG. 2E, the cover 210 includes an adapter plate 225e attached on the back side 202 near the right side 206 where the blower assembly 215 is disposed. The adapter plate 225e includes a single air outlet opening 230f that is positioned over one of the openings of the blower assembly 215. Accordingly, conditioned air can be directed out of the configurable evaporator unit 200 via the air outlet opening 230f. In this configuration, the adapter plate 225e is attached such that the air outlet opening 230f is positioned over the opening of the blower assembly 215 that is closer to the bottom side 204 of the configurable evaporator unit 200. It will be appreciated that in other embodiments, the adapter plate 225f can be attached such that the air outlet opening 230f is positioned over the opening of the blower assembly 215 that is closer to the top side 203 of the configurable evaporator unit 200. In some embodiments, the air outlet opening 230f can be sized to allow an air duct (also referred to as an "air hose") to be attached thereto.

In yet another configuration, as shown in FIG. 2F, the cover 210 includes an adapter plate 225f attached on the back side 202 near the right side 206 where the blower assembly 215 is disposed. The adapter plate 225f does not include an air outlet opening that could be positioned over one of the openings of the blower assembly 215. Accordingly, the configurable evaporator unit 200 is configured such that conditioned air is not directed out of the back side 202 of the configurable evaporator unit 200.

Each of the adapter plates 225a-f can be removably attached to the base 208 and/or the cover 210 using fasteners such as, for example, rivet(s), screw(s), bolt(s), nail(s), latch(es), self-locking mechanisms, etc. Also, in some embodiments, a top side, a bottom side, and/or a right side of the blower assembly 215 can include one or more openings, and the base 208 and/or the cover 210 can be configured to allow an adapter plate to be attached thereto to allow one or more air outlets to be positioned over one of the openings on the top side, bottom side, and/or right side of the blower assembly 215. Accordingly, in some embodiments, an end user can position an adapter plate with one or more air outlets on the front side 201, the back side 202, the top side 203, the bottom side 204, and/or the right side 206 of the configurable evaporator unit 200.

It will be appreciated that the configurations shown in FIGS. 2A-F are merely illustrative, and other configurations can be obtained using the embodiments described herein. That is, an end user can modify the configurable evaporator unit 200 to provide zero, one, two or more air outlet openings on each of the front side 201, the back side 202, the top side 203, the bottom side 204, and the right side 206 (e.g., the exterior side) of the housing 205. Also, it will be appreciated that the location of the adapter plates 225 can vary depending on the size and location of the blower assembly 215 in order to cover openings of the housing 205 and the blower assembly 215.

As shown in FIGS. 2A-F, the configurable evaporator unit 200 can provide flexibility to the end user to determine where one or more air outlet openings 230 are provided on the housing 205. This can provide improved flexibility in installing the configurable evaporator unit 200 within different vehicles. In particular, by selectively configuring the location of one or more of the air outlets 230a-f of the configurable evaporator unit 200, the configurable evaporator unit 200 can: increase useable space within the vehicle (e.g., reduce routing of air duct(s)); improve airflow distribution (e.g., reduce a pressure drop through air duct(s)) attached to the configurable evaporator unit 200; and provide flexibility in positioning the configurable evaporator unit 200 within the vehicle.

Figure 3A:
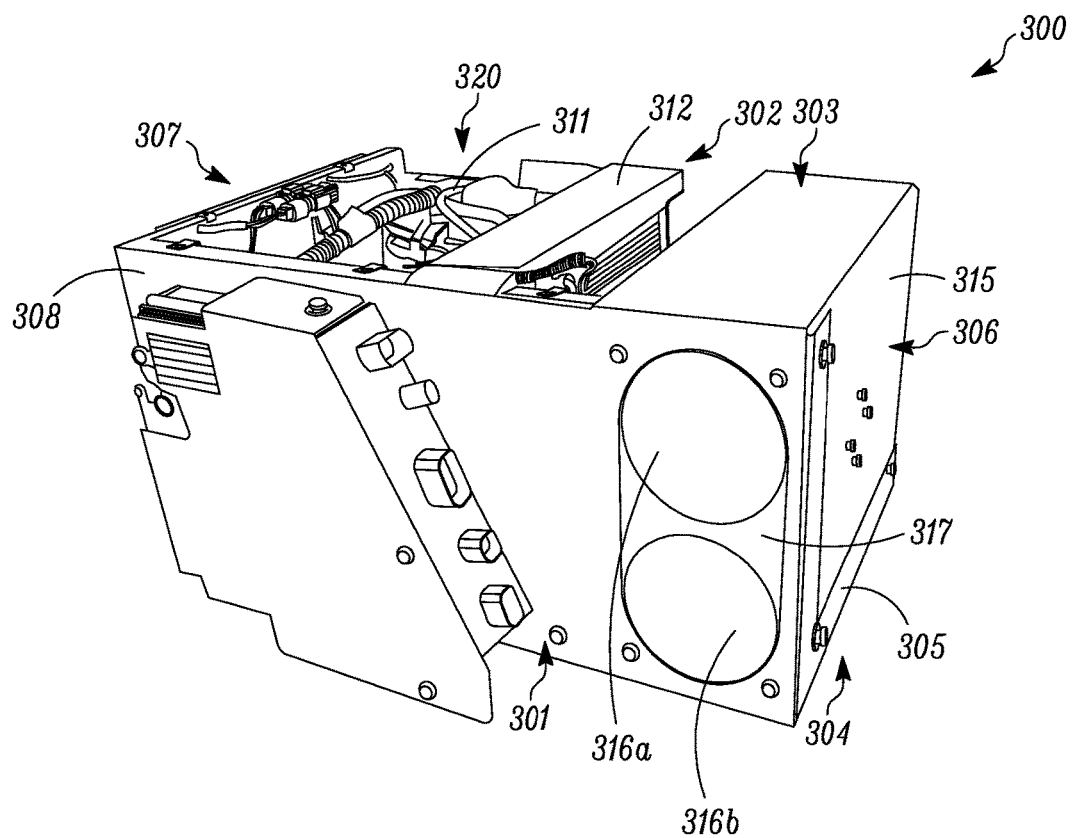
FIGS. 3A-C illustrate a configurable evaporator unit without a cover, according to one embodiment.
Figure 3B:
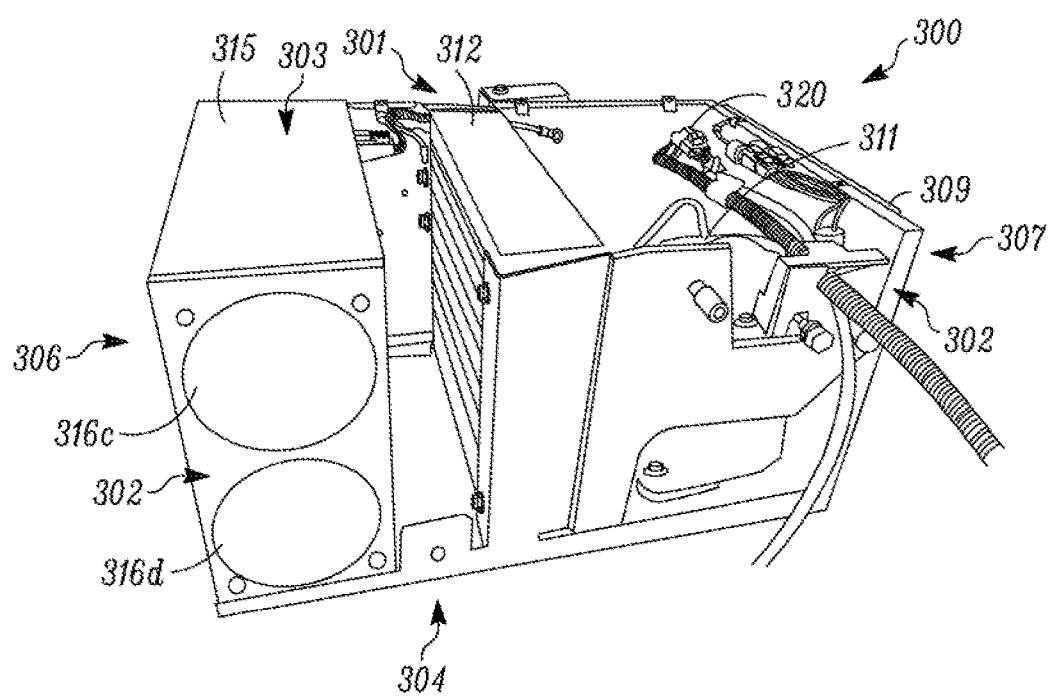
Figure 3C:
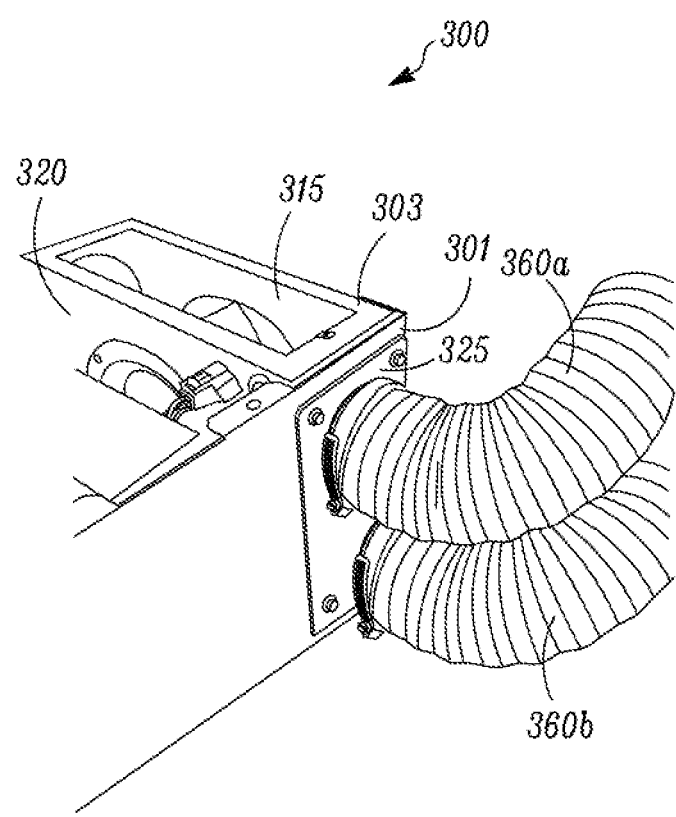

FIGS. 3A-C illustrate an embodiment of a configurable evaporator unit 300, similar to the configurable evaporator unit 200 shown in FIGS. 2A-F, without a cover. The configurable evaporator unit 300 can be used in a vehicle (e.g., the vehicle 100 shown in FIG. 1) as part of, for example, a secondary HVAC system. It will be appreciated that features of the configurable evaporator unit 200 shown in FIGS. 2A-F can be used with the features of the configurable evaporator unit 300 shown in FIGS. 3A-C and vice versa.

The configurable evaporator unit 300 has a front side 301, a back side 302, a top side 303, a bottom side 304, a right side 306, and a left side 307. The configurable evaporator unit 300 includes a housing 305 for housing a blower assembly 315 and an evaporator compartment 320.

The housing 305 includes a base 308. The base 308 defines the front side 301, the bottom side 304 and a portion of the right side 306. When fully assembled, the housing 305 can also include a cover (not shown) that can define the back side 302 and the top side 303. A surface of the blower assembly 315 defines the right side 306 and an air filter 309 of the evaporator compartment 320 defines the left side 307. It will be appreciated that in other embodiments, the base 308 or the cover (when fully assembled) can include a side surface (not shown) that can be configured to define the right side 306 rather than a surface of the blower assembly 315.

The evaporator compartment 320 includes a portion of a refrigeration circuit 311, an evaporator coil 312 and an air filter 309. The air filter 309 is configured to filter and direct air into the evaporator compartment 320. The evaporator coil 312 using refrigerant provided by the refrigeration circuit 311 is configured to condition (e.g., cool) air entering the evaporator compartment 320. The conditioned air is then directed to the blower assembly 315.

The blower assembly 315 includes an evaporator blower (not shown) that is configured to direct the conditioned air out of the configurable evaporator unit 300. Front and back sides of the blower assembly 315 include one or more openings 316a-d for directing conditioned air out of the blower assembly 315.

A front side of the base 308 includes an opening 317, that with the openings 316a,b, is configured to direct conditioned air out of the configurable evaporator unit 300. In some embodiments, when a cover (such as the cover 210 shown in FIGS. 2A-F) is provided, back and top sides of the housing 305 can include one or more openings for directing conditioned air out of the configurable evaporator unit 300. Also, in some embodiments, the right side of the blower assembly 315 and/or potentially a right side of the housing 305 (when the housing 305 covers a right side of the blower assembly 315) can include one or more openings for directing conditioned air out of the configurable evaporator unit 300.

In some embodiments, one or more of the openings 316a-d can be covered by attaching an adapter plate (e.g., the adapter plates 225a-f shown in FIGS. 2A-F) to the housing 305.

FIG. 3C illustrates a portion of the configurable evaporator unit 300 with air ducts 360a,b attached thereto. The configuration shown in FIG. 3C includes an adapter plate 325 with two air outlet openings (not shown) positioned over the 316a,b of the blower assembly 315 and the opening 317 of the base 308. The air ducts 360a,b are attached to the air outlet openings so that conditioned air directed out of the air outlet openings can be directed to various areas, for example, within a vehicle.

It will be appreciated that in some embodiments, a configurable evaporator unit can be provided such that the housing includes an N number of air outlet openings on different surfaces of the housing of the configurable evaporator unit (e.g., a front side, a back side, a top side, a bottom side, and a blower side) and the blower assembly includes an X number of openings, where X is a smaller value than N. In these embodiments, the blower assembly can be rotated and placed within the housing such that openings of the blower assembly are positioned to the particular sides of the configurable evaporator unit where conditioned air is to be directed out of the configurable evaporator unit.

Aspects:

It is appreciated that any of aspects 1-9 and 10-18 can be combined.

Aspect 1. A configurable evaporator unit for a secondary heating, ventilation and air conditioning (HVAC) system that provides conditioned air within a cabin portion of a vehicle, the configurable evaporator unit comprising:

a controller that controls the amount of heated or cooled conditioned air provided by the secondary HVAC system an evaporator compartment that includes an evaporator coil for conditioning air;

a blower assembly that houses an evaporator blower for directing conditioned air out of the configurable evaporator unit, the blower assembly including a front side surface, a back side surface, a top side surface, a bottom side surface, and an exterior side surface, and wherein the blower assembly includes a plurality of blower openings for directing conditioned air out of the blower assembly with each of the plurality of blower openings provided on one of the front side surface, the back side surface, the top side surface, the bottom side surface, and the exterior side surface;

a housing that houses the evaporator compartment and the blower assembly adjacent to the evaporator compartment, wherein the housing includes a front side, a back side, a top side, a bottom side, and an exterior side, and wherein the housing includes a plurality of housing openings with each of the plurality of housing openings disposed on one of the front side, the back side, the top side, the bottom side, and the exterior side, and wherein one or more of the plurality of housing openings is prevented from directing conditioned air out of the configurable evaporator unit.

Aspect 2. The configurable evaporator unit of aspect 1, further comprising:

a first adapter plate removably attached to the housing to cover a first blower opening of the plurality of blower openings and to cover and a first housing opening of the plurality of housing openings, wherein the first adapter plate includes an air outlet opening that is configured to direct conditioned air out of the configurable evaporator unit via the first blower opening and the first housing opening; and a second adapter plate removably attached to the housing to cover a second blower opening of the plurality of blower openings and to cover and a second housing opening of the plurality of housing openings, wherein the second adapter plate is configured to block conditioned air from exiting out of the configurable evaporator unit via the second blower opening and the second housing opening.

Aspect 3. The configurable evaporator unit of aspect 2, wherein the first adapter plate covers a third blower opening of the plurality of blower openings and covers a third housing opening of the plurality of housing openings.

Aspect 4. The configurable evaporator unit of aspect 3, wherein the first adapter plate is configured to block conditioned air from exiting out of the configurable evaporator unit via the third blower opening and the third housing opening.

Aspect 5. The configurable evaporator unit of aspect 3, wherein the first adapter plate includes a second air outlet opening that is configured to direct conditioned air out of the configurable evaporator unit via the third blower opening and the third housing opening.

Aspect 6. The configurable evaporator unit of any one of aspects 2-5, wherein the second adapter plate covers a fourth blower opening of the plurality of blower openings and covers a fourth housing opening of the plurality of housing openings.

Aspect 7. The configurable evaporator unit of aspect 6, wherein the second adapter plate is configured to block conditioned air from exiting out of the configurable evaporator unit via the fourth blower opening and the fourth housing opening.

Aspect 8. The configurable evaporator unit of aspect 6, wherein the second adapter plate includes a fourth air outlet opening that is configured to direct conditioned air out of the configurable evaporator unit via the fourth blower opening and the fourth housing opening.

Aspect 9. The configurable evaporator unit of any one of aspects 1-8, wherein the plurality of blower openings includes a first blower opening provided on a front side surface of the blower assembly, and wherein the blower assembly is configured to be rotatably housed in the housing such that the front side surface is positioned against any of the front side, the back side, the top side and the bottom side of the housing such that the first blower opening is positioned to align with any of the plurality of housing openings provided on any one of the front side, the back side, the top side, and the bottom side of the housing.

Aspect 10. A secondary heating, ventilation and air conditioning (HVAC) system for a cabin portion of a vehicle that provides conditioned air within the cabin portion, the secondary HVAC system comprising:

a controller configured to control operation of the secondary HVAC system;

an auxiliary power unit configured to provide power to the secondary HVAC system;

a refrigerant compressor configured to compress refrigerant, wherein the refrigerant compressor is powered by the auxiliary power unit;

a condenser unit configured to condense refrigerant received from the refrigerant compressor;

a configurable evaporator unit configured to provide conditioned air into the cabin portion of the vehicle, the configurable evaporator unit including:
  an evaporator compartment that includes an evaporator coil for conditioning air,
  a blower assembly that houses an evaporator blower for directing conditioned air out of the configurable evaporator unit, the blower assembly including a front side surface, a back side surface, a top side surface, a bottom side surface, and an exterior side surface, and wherein the blower assembly includes a plurality of blower openings for directing conditioned air out of the blower assembly with each of the plurality of blower openings provided on one of the front side surface, the back side surface, the top side surface, the bottom side surface, and the exterior side surface,
  a housing that houses the evaporator compartment and the blower assembly adjacent to the evaporator compartment, wherein the housing includes a front side, a back side, a top side, a bottom side, and an exterior side, and wherein the housing includes a plurality of housing openings with each of the plurality of housing openings disposed on one of the front side, the back side, the top side, the bottom side, and the exterior side, and
  wherein one or more of the plurality of housing openings is prevented from directing conditioned air out of the configurable evaporator unit.

Aspect 11. The secondary HVAC system of aspect 10, further comprising:

a first adapter plate removably attached to the housing to cover a first blower opening of the plurality of blower openings and to cover and a first housing opening of the plurality of housing openings, wherein the first adapter plate includes an air outlet opening that is configured to direct conditioned air out of the configurable evaporator unit via the first blower opening and the first housing opening; and a second adapter plate removably attached to the housing to cover a second blower opening of the plurality of blower openings and to cover and a second housing opening of the plurality of housing openings, wherein the second adapter plate is configured to block conditioned air from exiting out of the configurable evaporator unit via the second blower opening and the second housing opening.

Aspect 12. The secondary HVAC system of aspect 11, wherein the first adapter plate covers a third blower opening of the plurality of blower openings and covers a third housing opening of the plurality of housing openings.

Aspect 13. The secondary HVAC system of aspect 12, wherein the first adapter plate is configured to block conditioned air from exiting out of the configurable evaporator unit via the third blower opening and the third housing opening.

Aspect 14. The secondary HVAC system of aspect 12, wherein the first adapter plate includes a second air outlet opening that is configured to direct conditioned air out of the configurable evaporator unit via the third blower opening and the third housing opening.

Aspect 15. The secondary HVAC system of any one of aspects 11-14, wherein the second adapter plate covers a fourth blower opening of the plurality of blower openings and covers a fourth housing opening of the plurality of housing openings.

Aspect 16. The secondary HVAC system of aspect 15, wherein the second adapter plate is configured to block conditioned air from exiting out of the configurable evaporator unit via the fourth blower opening and the fourth housing opening.

Aspect 17. The secondary HVAC system of aspect 15, wherein the second adapter plate includes a fourth air outlet opening that is configured to direct conditioned air out of the configurable evaporator unit via the fourth blower opening and the fourth housing opening.

Aspect 18. The secondary HVAC system of any one of aspects 10-17, wherein the plurality of blower openings includes a first blower opening provided on a front side surface of the blower assembly, and wherein the blower assembly is configured to be rotatably housed in the housing such that the front side surface is positioned against any of the front side, the back side, the top side and the bottom side of the housing such that the first blower opening is positioned to align with any of the plurality of housing openings provided on any one of the front side, the back side, the top side, and the bottom side of the housing.

Although a number of systems, devices and methods are described herein, it is contemplated that a single system, device or method can include more than one of the above discussed subject matter. Accordingly, multiple of the above systems, devices, and methods can be used together in a single system or method.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A configurable evaporator unit for a secondary heating, ventilation and air conditioning (HVAC) system that provides conditioned air within a cabin portion of a vehicle, the configurable evaporator unit comprising:
    an evaporator compartment that includes an evaporator coil for conditioning air;
    a blower assembly that houses an evaporator blower for directing conditioned air out of the configurable evaporator unit, the blower assembly including:
        a front side surface, a back side surface, a top side surface, a bottom side surface, and a left or right side surface, and
        a plurality of blower openings for directing conditioned air out of the blower assembly, the plurality of blower openings disposed on at least two of the front side surface, the back side surface, the top side surface, the bottom side surface, and the left or right side surface; and
    a housing that houses the evaporator compartment and the blower assembly adjacent to the evaporator compartment, the housing including:
        a front side, a back side, a top side, a bottom side, and a left or right side, and
        a plurality of housing openings disposed on at least two of the front side, the back side, the top side, the bottom side, and the left or right side, and
    wherein the conditioned air is directed from the plurality of blower openings to multiple of the plurality of housing openings, at least one of the multiple of the plurality of housing openings is blocked from directing conditioned air out of the configurable evaporator unit.

2. The configurable evaporator unit of claim 1, further comprising:
    a first adapter plate removably attached to the housing to be positioned over a first blower opening of the plurality of blower openings and over a first housing opening of the plurality of housing openings, wherein the first adapter plate includes a first air outlet opening configured to direct conditioned air out of the configurable evaporator unit via the first blower opening and the first housing opening; and
    a second adapter plate removably attached to the housing be positioned over a second blower opening of the plurality of blower openings and over and a second housing opening of the plurality of housing openings, wherein the second adapter plate is configured to block conditioned air from exiting out of the configurable evaporator unit via the second blower opening and the second housing opening, and the at least one of the multiple of the plurality of housing openings includes the second housing opening.

3. The configurable evaporator unit of claim 2, wherein the first adapter plate is positioned over a third blower opening of the plurality of blower openings.

4. The configurable evaporator unit of claim 3, wherein the first adapter plate is configured to block conditioned air from exiting out of the configurable evaporator unit via the third blower opening.

5. The configurable evaporator unit of claim 3, wherein the first adapter plate includes a second air outlet opening configured to direct conditioned air out of the configurable evaporator unit via the third blower opening.

6. The configurable evaporator unit of claim 2, wherein the second adapter plate is positioned over a third blower opening of the plurality of blower openings.

7. The configurable evaporator unit of claim 6, wherein the second adapter plate is configured to block conditioned air from exiting out of the configurable evaporator unit via the third blower opening.

8. The configurable evaporator unit of claim 6, wherein the second adapter plate includes a second air outlet opening for the configurable evaporator unit that is configured to direct conditioned air out of the configurable evaporator unit via the third blower opening.

9. The configurable evaporator unit of claim 1, wherein the plurality of blower openings includes a first blower opening provided on a front side surface of the blower assembly, and wherein the blower assembly is configured to be rotatably housed in the housing allowing the front side surface of the blower assembly to be positioned against any one of the front side, the back side, the top side, and the bottom side of the housing such that the first blower opening is positioned to align with any one of the plurality of housing openings provided on any one of the front side, the back side, the top side, and the bottom side of the housing.

10. A secondary heating, ventilation and air conditioning (HVAC) system for a cabin portion of a vehicle that provides conditioned air within the cabin portion, the secondary HVAC system comprising:
   a controller configured to control operation of the secondary HVAC system;
   an auxiliary power unit configured to provide power to the secondary HVAC system;
   a refrigerant compressor configured to compress refrigerant, wherein the refrigerant compressor is powered by the auxiliary power unit;
   a condenser unit configured to condense refrigerant received from the refrigerant compressor;
   a configurable evaporator unit configured to provide conditioned air into the cabin portion of the vehicle, the configurable evaporator unit including:
      an evaporator compartment that includes an evaporator coil for conditioning air,
      a blower assembly that houses an evaporator blower for directing conditioned air out of the configurable evaporator unit, the blower assembly including:
         a front side surface, a back side surface, a top side surface, a bottom side surface, and a left or right side surface, and
         a plurality of blower openings for directing conditioned air out of the blower assembly, the plurality of blower openings disposed on at least two of the front side surface, the back side surface, the top side surface, the bottom side surface, and the left or right side surface, and
      a housing that houses the evaporator compartment and the blower assembly adjacent to the evaporator compartment, the housing including:
         a front side, a back side, a top side, a bottom side, and a left or right side, and
         a plurality of housing openings disposed on at least two of the front side, the back side, the top side, the bottom side, and the left or right side, and
      wherein the conditioned air is directed from the plurality of blower openings to multiple of the plurality of housing openings, at least one of the multiple of the plurality of housing openings is blocked from directing conditioned air out of the configurable evaporator unit.

11. The secondary HVAC system of claim 10, further comprising:
   a first adapter plate removably attached to the housing to be positioned over a first blower opening of the plurality of blower openings and over a first housing opening of the plurality of housing openings, wherein the first adapter plate includes a first air outlet opening configured to direct conditioned air out of the configurable evaporator unit via the first blower opening and the first housing opening; and
   a second adapter plate removably attached to the housing to be positioned over a second blower opening of the plurality of blower openings and over a second housing opening of the plurality of housing openings, wherein the second adapter plate is configured to block conditioned air from exiting out of the configurable evaporator unit via the second blower opening and the second housing opening, and the at least one of the multiple of the plurality of housing openings includes the second housing opening.

12. The secondary HVAC system of claim 11, wherein the first adapter plate is positioned over a third blower opening of the plurality of blower openings.

13. The secondary HVAC system of claim 12, wherein the first adapter plate is configured to block conditioned air from exiting out of the configurable evaporator unit via the third blower opening.

14. The secondary HVAC system of claim 12, wherein the first adapter plate includes a second air outlet opening configured to direct conditioned air out of the configurable evaporator unit via the third blower opening.

15. The secondary HVAC system of claim 11, wherein the second adapter plate is positioned over a third blower opening of the plurality of blower openings.

16. The secondary HVAC system of claim 15, wherein the second adapter plate is configured to block conditioned air from exiting out of the configurable evaporator unit via the third blower opening.

17. The secondary HVAC system of claim 15, wherein the second adapter plate includes a second air outlet opening for the configurable evaporator unit that is configured to direct conditioned air out of the configurable evaporator unit via the third blower opening.

18. The secondary HVAC system of claim 10, wherein the plurality of blower openings includes a first blower opening provided on a front side surface of the blower assembly, and wherein the blower assembly is configured to be rotatably housed in the housing allowing the front side surface of the blower assembly to be positioned against any one of the front side, the back side, the top side, and the bottom side of the housing such that the first blower opening is positioned to align with any one of the plurality of housing openings provided on any one of the front side, the back side, the top side, and the bottom side of the housing.

* * * * *